J. CONLEY.
Pitman Joint.

No. 208,571. Patented Oct. 1, 1878.

Witnesses:
Theodore G. Hoster.
B. S. Clark.

Inventor:
John Conley
By Fitch, Fitch
Attys.

UNITED STATES PATENT OFFICE.

JOHN CONLEY, OF ST. JOSEPH, ASSIGNOR TO HIMSELF, ABEL W. WELLS, AND HENRY C. WARD, OF SAME PLACE, AND SAID WELLS AND WARD ASSIGNORS TO L. V. MOULTON, OF GRAND RAPIDS, MICHIGAN.

IMPROVEMENT IN PITMAN-JOINTS.

Specification forming part of Letters Patent No. 208,571, dated October 1, 1878; application filed May 5, 1877.

*To all whom it may concern:*

Be it known that I, JOHN CONLEY, of St. Joseph, Berrien county, in the State of Michigan, have invented an Improved Pitman-Joint, of which the following is a full, clear, and exact description, reference being had to the drawings forming part of this specification.

My invention relates to that class of pitmen which are made with solid ends and a movable block or blocks inserted in a recess and adjusted and secured by a set-screw or wedge.

The object of my invention is to provide a cheap, durable, and compact joint, and to obviate the danger of setting the bearing-surfaces too tight against the journal when taking up the lost motion occasioned by wear of the parts.

It consists in a metal block set in a suitable recess or opening in the end of the pitman, one end of said block forming a part of the bearing-surface for the journal, and one end of the said recess forming the remainder of said bearing-surface, and said block secured by a screw at the side, as hereinafter more fully described.

Figure 1:
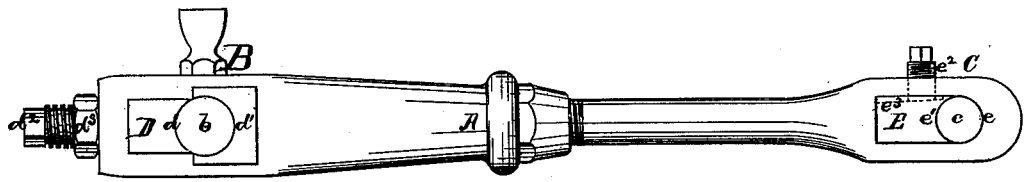
Figure 2:
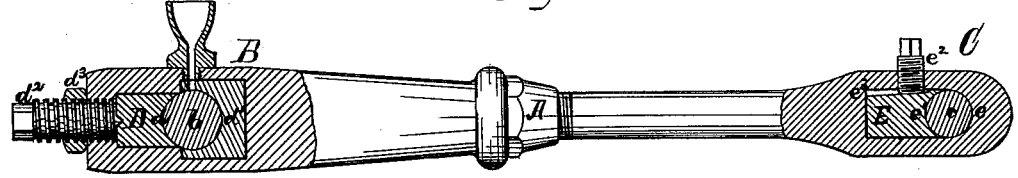

In the accompanying drawings, Figure 1 is a side elevation of a pitman embodying my invention. Fig. 2 is a similar view of the same, showing the pitman-joints in longitudinal section.

A is the pitman. B is a joint of the ordinary form. C is a joint embodying my improvement, $b$ and $c$ being respectively the journals of said joints.

In carrying out my invention, I take a metal block, E, one end of which is made concave to form a part of the bearing-surface of the journal $c$, and also provided with a bevel-channel, $e^3$, in one of its sides. Said block is placed in a suitable opening in the end of the pitman, as shown, the outer end of said opening being concave to form the remaining portion of the bearing-surface for the journal $c$. To secure the block E, I provide a set-screw, $e^2$, passing through a threaded opening in the side of the pitman and between the sides of the bevel-channel $e^3$, and impinging upon the inclined plane formed by the bottom of the channel $e^3$.

The operation of my device is as follows: When it becomes desirable to take up the lost motion in the joint I loosen the screw $e^2$, then bring the concave surfaces $e$ and $e^1$ in contact with the journal $c$, then tighten the screw $e^2$. It will be observed that the screw $e^2$ does not force the surfaces $e$ and $e^1$ against the journal $c$, as in the usual device; hence, however tight it may be turned, no binding of the joint can occur; also, that the bottom of the channel $e^3$, being an inclined plane, enables the screw $e^2$ to hold the block E securely against the journal $c$, and also enables the block E to act as a lock-nut upon the screw $e^2$, but is not at such an angle as to force the block E against the journal $c$; hence no binding of the joint can occur from that cause, however tight the screw $e^2$ may be turned. It will also be observed that by this arrangement I am enabled to place the journal much nearer the end of the pitman, thereby being enabled to use the device in close quarters where I otherwise could not—as, for instance, on a mower in which the sickle-bar can be raised to a vertical position.

I am aware that a movable block placed in a suitable recess in a pitman and forced against the journal by a screw or wedge has been used. Such an arrangement I do not claim.

What I do claim, and wish to secure, is as follows:

1. In combination with the block E, the channel $e^3$ and screw $e^2$, substantially as and for the purpose specified.

2. In combination with the pitman A and journal $c$, the block E, channel $e^3$, and screw $e^2$, substantially as and for the purpose specified.

JOHN CONLEY.

Witnesses:
 W. E. HILDRETH,
 ALFRED BALDREY.